United States Patent [19]

Hodas

[11] 4,246,825

[45] Jan. 27, 1981

[54] SNARE MUTING DEVICE

[76] Inventor: Robert S. Hodas, Rte. 1, Box 441 F, Half Moon Bay, Calif. 94019

[21] Appl. No.: 94,139

[22] Filed: Nov. 14, 1979

[51] Int. Cl.[3] .............................................. G01D 13/02

[52] U.S. Cl. .................................... 84/415; 84/411 M

[58] Field of Search ...................... 84/411 M, 415, 417

[56] References Cited

U.S. PATENT DOCUMENTS

| | | | |
|---|---|---|---|
| 609,068 | 8/1898 | Zeidler | 84/411 M |
| 974,647 | 11/1910 | Du Lany | 84/411 M |
| 1,265,917 | 5/1918 | Jay | 84/415 |
| 1,281,107 | 10/1918 | Van Valkenburg | 84/415 |
| 1,832,227 | 11/1931 | Ludwig | 84/415 |
| 1,894,068 | 1/1933 | Soderberg | 84/415 |
| 4,102,235 | 7/1978 | Le Masters | 84/411 M |

FOREIGN PATENT DOCUMENTS

| | | | |
|---|---|---|---|
| 7549 | 10/1879 | Fed. Rep. of Germany | 84/411 M |
| 181959 | 3/1907 | Fed. Rep. of Germany | 84/415 |
| 430256 | 6/1926 | Fed. Rep. of Germany | 84/411 M |

*Primary Examiner*—Lawrence R. Franklin

*Attorney, Agent, or Firm*—Reising, Ethington, Barnard, Perry & Brooks

[57] ABSTRACT

A device for muting the snares of a drum to prevent remotely induced or extraneous vibrations from interfering with the normal playing of the drum.

6 Claims, 5 Drawing Figures

SNARE MUTING DEVICE

TECHNICAL FIELD

The present invention relates to a device for muting the snares of a drum to prevent remotely induced and, therefore, undesired or sympathetic vibrations of the snare members. More specifically, it is known that when a snare drum is subjected to extraneous vibrations induced by other instruments, such vibrations can cause the snares of a drum to set up an undesired buzz or overtone.

The problem of undesired vibrations of a snare is normally caused by the close proximity of other drums or amplified instruments as are commonly used today. Such extraneous vibrations, by inducing vibrations in a drum, set up a buzz or audible sound which interferes with the desired tones being produced by the normal playing of the drum. Such undesirable buzz is particularly identifiable when recordings are being made.

BACKGROUND ART

Snare muting or snare modifying devices are known to be broadly old as shown in the following U.S. Pat. Nos.

DuLany: 974,647
Jay: 1,265,917
VanValkenburg: 1,281,107
Ludwig: 1,832,227
Lebow: 2,078,004
Thompson: 3,635,119

DISCLOSURE OF THE INVENTION

Applicant has developed a simplified snare muting device which may be readily and conveniently mounted on the bottom of the drum in such a way that a lever may be moved between two positions one of which allows a muting member to move into engagement with the drum snares to prevent extraneous or sympathetic vibrations from inducing undesired snare vibrations and another position which retracts such muting member, allowing the snares to function in their normal manner when the drum is being played under conditions where extraneous vibrations are no problem or where broken snares may be replaced. More specifically, Applicant's device includes a supporting beam mounted at its respective ends to the drum casing so as to be offset from the center of the drum and extending transversely of the snares. A snare muting member is adjustably mounted on the transverse beam essentially midway between the ends thereof and includes a resilient muting pad generally of the same width as the snares and adapted to transversely span such snares. The muting mechanism includes means for biasing the resilient muting pad into engagement with the snares and a cam/lever arrangement whereby the muting member may be moved vertically with respect to the transverse beam and out of engagement with the snares.

The muting mechanism also incorporates means for adjusting the force with which the resilient muting member is biased against the snares and against which biasing force the cam/lever arrangement operates to disable the muting mechanism. It has been found that vibrating waves build up to a maximum at a given distance from the center of the head. It is in the off-center area of maximum vibration that the snares must be muted to assure effective operation of the subject device in eliminating extraneous vibrations while still allowing the drum to be played in a normal manner.

BRIEF DESCRIPTION OF DRAWINGS

The details of Applicant's snare muting device are set forth in the following specification and are shown in the drawings wherein.

BEST MODE FOR CARRYING OUT THE INVENTION

Figure 1:
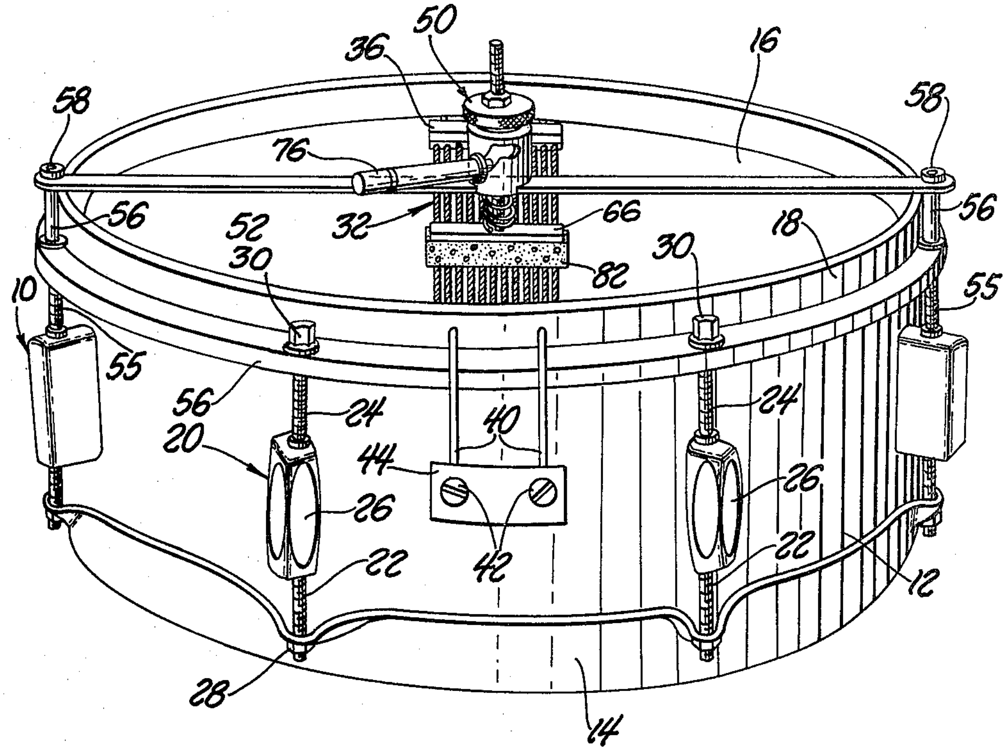
FIG. 1 is a perspective view of a snare drum with the bottom side up to show the snare muting device.
Figure 2:
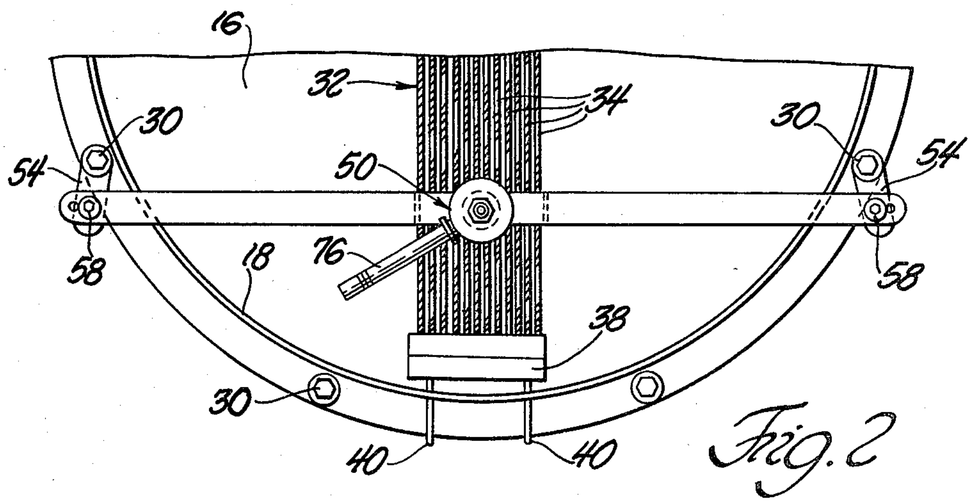
FIG. 2 is a partial plan view of the bottom section of the snare drum incorporating the muting device.

Referring to FIGS. 1 and 2, a drum of the snare type is shown generally at 10 with the bottom side up and includes a cylindrical body member 12, an upper or percussion head, not shown, and an upper head retaining ring 14 closely fitted about body member 12 to clamp the upper head thereto. The drum also includes a bottom or snare head 16 secured to drum body 12 by retaining ring 18.

Drum head tensioning devices are indicated at 20. As illustrated in FIG. 1, tensioning devices 20 include screw elements 22 and 24 fixed to anchor members 26 and which elements extend through suitable holes in the upper and lower head retaining rings 14 and 18 and terminate in integral square headed lugs 28 and 30. By utilizing a suitable tool to engage lugs 28 and 30, screw elements 22 and 24 will be adjusted axially to anchor members 26 thereby moving retaining rings 14 and 18 relative to body 12 to vary the tautness of the drum heads.

Figure 3:
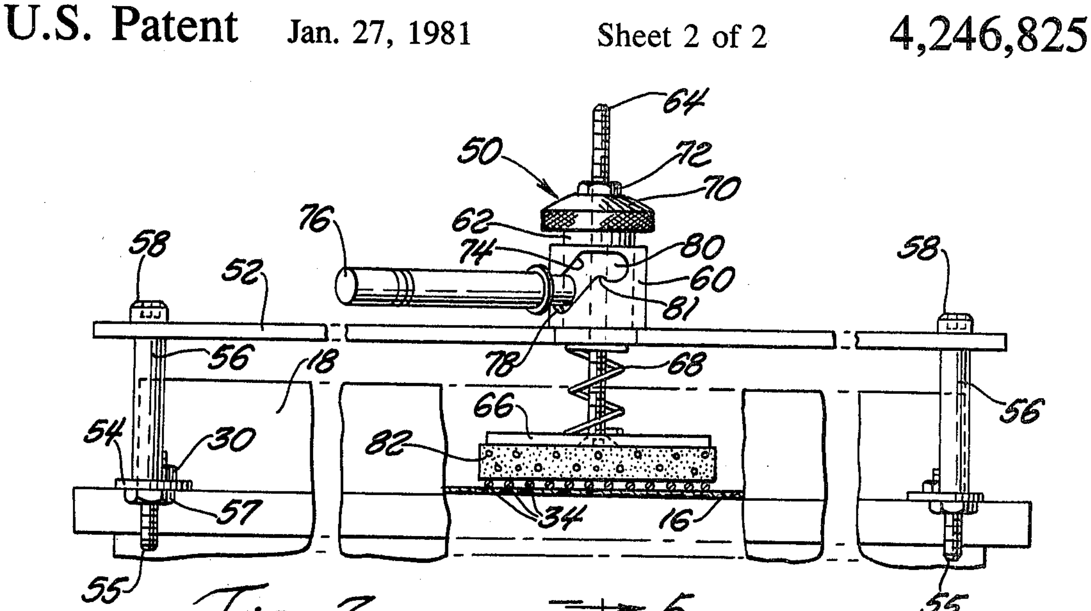
FIGS. 3 and 4 are partially sectioned side elevational views through the bottom section of the drum showing the muting device in its operative and inoperative positions.
Figure 4:
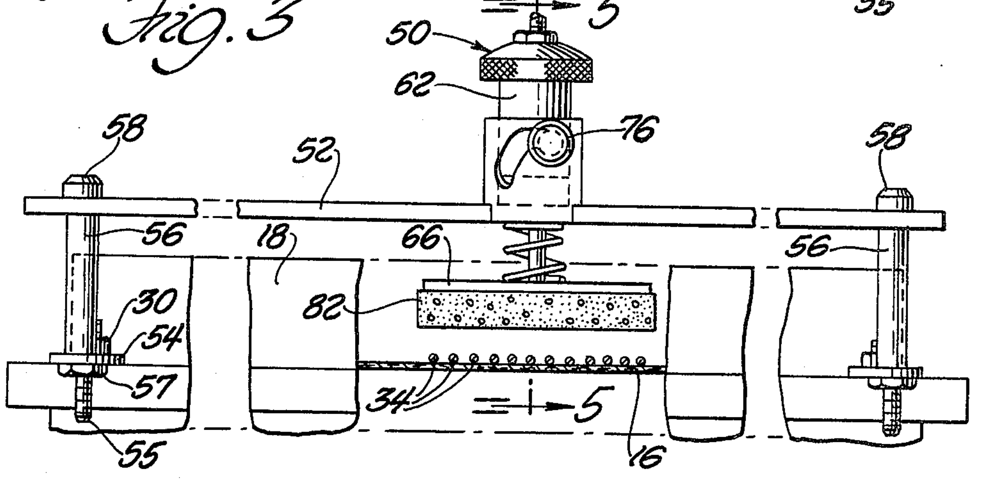

A set of snares is indicated generally at 32 and consists of a plurality of string-like elements 34 secured at their outer ends to bracket elements 36 and 38. Snare elements 34 are typically formed of coiled wire or gut. Snare brackets 36 and 38 are anchored to drum body 12 through suitable wire elements 40 fixed at their outer ends to adjustable screws 42 on body bracket 44. As best seen in FIGS. 3 and 4, snare strings 34 are positioned in abutting relationship to bottom head 16. The tension of the strings may be varied by a conventional snare adjusting device, not shown, mounted on the opposite side of the drum body 12 from anchor screws 42 and suitably connected to snare bracket 36.

In normal operation, as the upper drum head is struck by the drumsticks, vibrations are transmitted to the lower drum head 16 which, in turn, induces vibrations in elements 34 to give the well-known snare effect. As already noted, extraneous vibrations, as by adjacent drums or other amplified instruments, can also set up sympathetic vibrations in snare elements 34 when drum 10 is not being played. To mute or eliminate such sympathetic and undesired vibrations in snare elements 34, a snare muting device is provided and is indicated generally at 50.

Muting device 50 includes a beam element 52 supported at its outer ends in vertically spaced relationship to bottom head retaining ring 18. In order to mount muting device 50 upon drum 10, a pair of tabs 54 having spaced end holes are provided and are mounted at one end between lugs 30 and ring 18. As seen in FIGS. 3 and 4, stud members 55 are supported at the other end of the tabs 54 by nuts 57 and are surrounded by spacer sleeves 56. Nut members 58 thread within spacer sleeves 56 to retain the ends of beam 52 against sleeves 56 in vertically spaced relation to bottom head retaining ring 18.

As best seen in FIG. 2, beam 52 is supported upon drum 10 so as to extend transversely or generally normally to snare strings 34.

Figure 5:
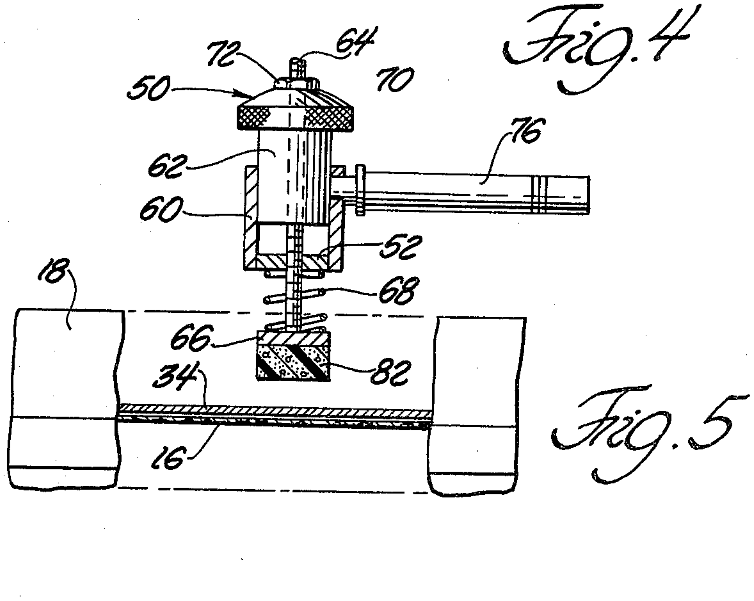
FIG. 5 is a sectional view along line 5—5 of FIG. 4.

Muting device 50 includes a hollow cylindrical member 60 fixed to support beam 52 generally midway of the length thereof. As best seen in FIGS. 4 and 5, the bottom end of member 60 is slotted to receive beam 52. A cylindrical sleeve 62 is rotatably supported within the fixed member 60 and includes an axial opening adapted to rotatably support a threaded stud member 64 which extends through a suitably aligned opening in beam 52. A rectangular base or plate member 66 is fixed to threaded stud 64 and supports one end of spring element 68 the other end of which seats against beam 52 to bias plate 66 away from beam 52 and toward bottom drum head 16.

Threaded stud member 64 extends axially beyond cylindrical members 60 and 62 and has an adjustable nob 70 threadably supported thereon. As nob 70 is threaded on stud 64 into abutting engagement with sleeve 62, the stud member is moved axially relative to sleeve 62 thereby varying the tension of spring element 68. A nut 72 is adapted to lock nob 70 on stud 64 after the tension of spring 68 has been set by the nob.

An inclined slot 74 is formed through fixed sleeve member 60. A lever 76 extends through slot 74 and is fixed at one end to rotatable cylindrical member 62. Slot 74 includes axially spaced ends 78 and 80. Slot end 80 is curved to provide a notch and a slight axial projection 81 which tends to retain lever 76 in position 80 until lifted against the force of spring 68.

An elastomeric pad 82 is bonded or otherwise fixed to plate 66 and is basically of the same shape as the plate and, as seen in FIGS. 1, 3, and 4, extends transversely or normally to snare elements 34.

While illustrated in rectangular form, plate 66 and pad 82 may be square or circular in shape whereby there is no problem of assuring that the muting pad will always completely span all of the snare elements 34.

As seen in FIGS. 1 and 2, snare set 32 is symmetrically disposed about a diameter of bottom drum head 16 with support beam 52 being generally normal to such diameter. At the same time, it is to be noted that beam 52 and elastomeric pad 82 are offset from the center of drum head 16 as best seen in FIG. 2. It has been found that the undesirable sympathetic or extraneous vibrations build up maximally in an area of between one-half and two-thirds the radial distance between the drum head center and retaining ring 18. Accordingly, the radially offset location of support beam 52 is such as to position the elastomeric pad 82 to engage the snares in this critical area and which location also permits the drum to be played in its normal manner.

During such playing conditions when extraneous vibrations are extant and to be eliminated from inducing undesirable vibrations in snare set 32, lever 76 is rotated to end 78 of slot 74 whereby elastomeric pad 82 is biased against snare set 32 as seen in FIG. 3.

When a snare 34 is to be repaired or the muting function is unnecessary, lever 76 is rotated relative to sleeve 60, moving the lever to end 80 of the slot to lodge behind projection 81, as shown in FIG. 4, which causes rotatable sleeve 62 to move axially away from the fixed sleeve 60 to compress spring 68 and vertically space elastomeric pad 82 away from snare elements 34 and permitting the elements to be replaced quickly if broken or the drum to be played in normal fashion.

As noted, the force with which spring 68 presses elastomeric pad 82 against snare elements 34 can be adjusted by changing the axial position of threaded stud member 64 relative to rotatable sleeve 62 by rotating nob 70 against sleeve 62 to axially move stud member 64.

Other modifications of the invention are possible within the intended scope of the hereinafter appended claims.

What is claimed is:

1. A snare muting mechanism for a drum of the type including cylindrical drum body, a bottom head enclosing one end of said body, a retaining ring for securing said head to said body, and a plurality of snare elements extending centrally across and in abutting relationship with the bottom head, said muting mechanism comprising:

a beam member, means supporting the ends of said beam upon and vertically spaced from said drum head retaining ring, said beam being generally normal to and vertically spaced from said snare elements, an elastomeric member adapted to clampingly retain the snare elements against the bottom drum head, and a device for moving said elastomeric member into and out of clamping engagement with said drum head, said device including:

a first cylindrical member fixed to said beam member, a second cylindrical member rotatably mounted in and axially movable to said first cylindrical member, a stud member coaxially disposed within said first and second cylindrical members and projecting through an opening in said beam member, a plate element fixed to one end of the stud member and disposed between said beam member and said snare elements, said elastomeric member being secured to said plate element and disposed proximate said snare elements, a spring element supported between said beam and said plate element and biasing the plate element toward said snare elements, nut means adjustably fixing said stud member to said second cylindrical member, an inclined slot formed through said first cylindrical member and including axially spaced end positions, a lever having one end extending through said slot and being fixed to said second cylindrical member, said lever being rotatable to a first end position within said slot whereby said spring element moves said elastomeric member to clamp the snare elements against the bottom drum head, said lever being rotatable to the other end position within said slot against the force of said spring element whereby the elastomeric elemeny is vertically spaced from said snare elements.

2. A snare muting mechanism as set forth in claim 1 wherein said beam member is mounted off-center relative to the drum head whereby the elastomeric member is positioned closer to one end of said snare elements than the other.

3. A snare muting mechanism as set forth in claim 1 wherein said nut means is threadably mounted on said stud member whereby the axial position of said stud member may be adjusted relative to the second cylindrical member to vary the force with which said spring element holds the elastomeric member in clamping engagement against the bottom drum head.

4. A snare muting mechanism as set forth in claim 1 wherein the other end position of said slot includes a notch for retaining said lever in said other end position against the force of said spring element.

5. A snare muting mechanism as set forth in claim 1 wherein said first and second cylindrical members are disposed on the vertically opposite side of said beam member relative to said elastomeric member.

6. A snare muting mechanism as set forth in claim 1 wherein the beam supporting means comprises:

a pair of tab elements fixed at one end to the head retaining ring, a pair of threaded screw elements respectively secured to the other ends of the tab elements, a sleeve element loosely disposed on each screw element and supported on the associated tab element, the outer ends of said beam member being respectively supported on said sleeve elements and including holes through which the screw elements project, and nut means coacting with the screw elements to secure the beam against said sleeve elements.

* * * * *